T. J. HOOVER.
Rotary Harrows.
No. 157,827. Patented Dec. 15, 1874.
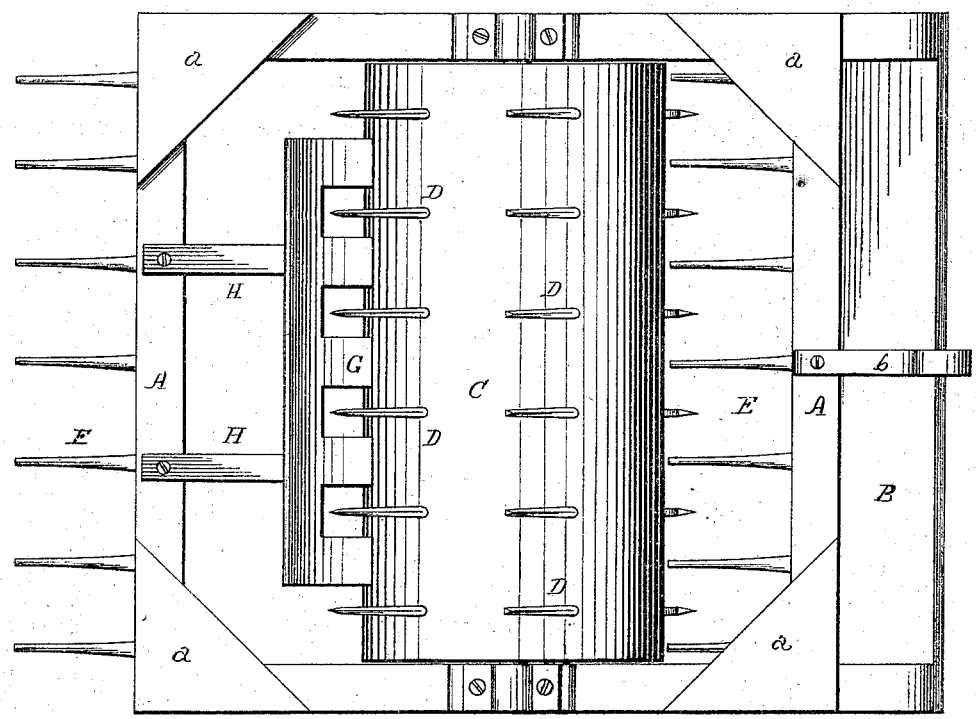
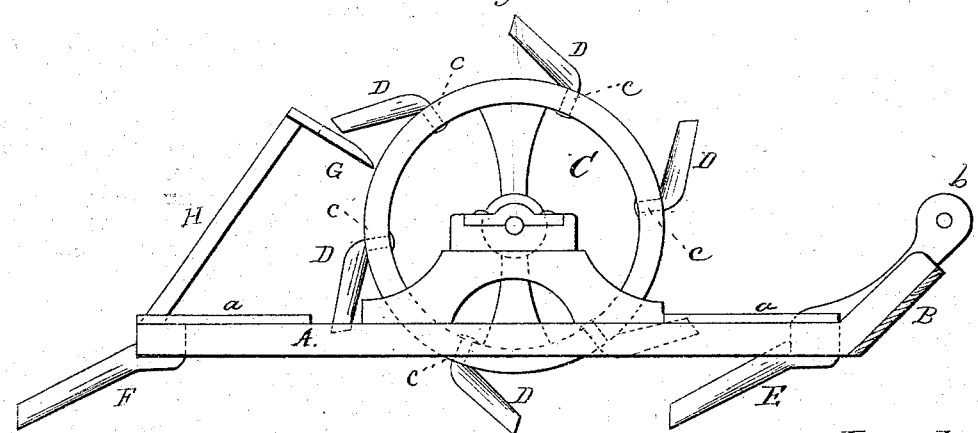

UNITED STATES PATENT OFFICE.

THOMAS J. HOOVER, OF WOODBURY, TENNESSEE.

IMPROVEMENT IN ROTARY HARROWS.

Specification forming part of Letters Patent No. 157,827, dated December 15, 1874; application filed October 26, 1874.

*To all whom it may concern:*

Be it known that I, THOMAS J. HOOVER, of Woodbury, in the county of Cannon and State of Tennessee, have invented certain new and useful Improvements in Rotary Harrows, of which the following is a specification:

This invention relates to that class of harrows in which is employed a revolving cylinder armed with cutters or teeth; and it has for its object to render harrows of this description more effective in operation than others heretofore constructed.

The invention consists in the combination, with a cylinder mounted in a frame and provided with tangentially-arranged cutting and crushing blades or knives, of a scraper-blade having teeth, between which the knives on the cylinder pass, thereby preventing the accumulation of trash, and clearing the blades and cylinder.

In the drawings, Figure 1 is a plan or top view, representing the various parts in position. Fig. 2 is a side elevation of the same.

The frame of the harrow is constructed either of wood or metal, A, and is made of a square, rectangular, or other suitable form. Corner-pieces *a* may in certain instances be applied to the frame, strengthening the same. The front of the frame carries an upwardly-inclined or slanting board, B, which readily glides over the clods or unbroken earth, and to the center of the front cross-bar of the frame is applied the draft-tongue *b*. The greater portion of the interior of the frame is occupied by a large cylinder, C, which is provided with a series of cutters or teeth, D, on its periphery, said cutters or teeth being wrought or fashioned with a cutting, breaking, or crushing surface, and are, preferably, formed separately and attached to the cylinder, so that if one becomes broken or injured it can be replaced by a new one. This is preferably accomplished by providing the cutting or crushing teeth with laterally-projecting arms *c*, which are fitted and secured in a recess in the cylinder, whereby, when in position, the cutting or crushing blade will be in a tangential line with respect to the cylinder, so that the entire cutting or crushing edge of the blades will strike the clods of earth. It is evident, however, that the cylinder could be cast entire with the cutting or crushing blades. The cylinder, with its cutting or crushing blades, is used in connection with a front and rear series of stationary cutters or teeth, E F, applied to the cross-bars of the harrow-frame. The fixed cutters or teeth are sharpened at their front and extend diagonally in a rearward direction, so as to cut or penetrate through the clods of earth. The front stationary cutters E serve to collect the clods of earth and to partly sever the same, and then the tangentially-arranged blades on the revolving cylinders cut, crush, or break the said clods, and the rear stationary teeth F act upon such small clods which are not fully crushed or broken, and leave the ground in small furrows. A scraper-blade, G, extends transversely across the frame of the harrow, in close proximity to the revolving cylinder, and is mounted upon inclined arms H, extending from the frame, and it is constructed or provided with notches or teeth similar to a comb, so as to permit the blades on the cylinder to pass between them.

It will be seen that the tangential teeth of the scraper-blades G are arranged so that the knives on the cylinder pass between the same, and are thereby prevented from clogging by the accumulation of trash, and the said scraper-teeth also clean the cylinder.

The cylinder in its revolution will crush the clods by its weight, and the downward flat stroke of the tangentially-arranged knives will completely crush, break, or cut the same in a most effective manner.

I claim as my invention—

The combination with the frame carrying the cylinder, with its tangentially-arranged cutting and crushing blade D, of the scraper-blade G, having comb-like teeth for clearing the cylinder and its blades of trash, substantially as described.

In testimony that I claim the foregoing I have hereunto set my hand.

THOMAS J. HOOVER.

Witnesses:
D. B. VANCE,
M. B. KITTRELL.